United States Patent
Dhaliwal et al.

(10) Patent No.: US 10,614,479 B2
(45) Date of Patent: Apr. 7, 2020

(54) ATTENDANCE VERIFICATION

(71) Applicant: INTERNATIONAL BUSINESS MACHINES CORPORATION, Armonk, NY (US)

(72) Inventors: Jasbir K. Dhaliwal, Carlton (AU); Timothy M. Lynar, Carlton (AU); John M. Wagner, Plainville, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 932 days.

(21) Appl. No.: 14/972,500

(22) Filed: Dec. 17, 2015

(65) Prior Publication Data

US 2017/0178175 A1 Jun. 22, 2017

(51) Int. Cl.
*G06Q 30/02* (2012.01)
*H04W 4/02* (2018.01)
(Continued)

(52) U.S. Cl.
CPC ..... *G06Q 30/0236* (2013.01); *G06Q 10/1095* (2013.01); *G08B 25/08* (2013.01); *G08B 27/003* (2013.01); *G08B 27/005* (2013.01); *G08B 27/006* (2013.01); *H04W 4/023* (2013.01); *H04W 4/80* (2018.02)

(58) Field of Classification Search
USPC ................................. 705/7.11–7.42
See application file for complete search history.

(56) References Cited

U.S. PATENT DOCUMENTS 7,216,109 B1 5/2007 Donner
8,454,441 B2 6/2013 Auterio et al.
(Continued)

FOREIGN PATENT DOCUMENTS

JP 2003108804 A 4/2003
WO 2012047669 A2 4/2012
WO 2015069901 A1 5/2015

OTHER PUBLICATIONS

Ribeiro, Fabio, "Attendance Registration and Occupancy Estimation using Indoor Positioning Systems", Tecnico Lisboa, Nov. 2015. (Year: 2015).*

(Continued)

*Primary Examiner* — Amber A Misiaszek
(74) *Attorney, Agent, or Firm* — Cantor Colburn LLP; Joseph Petrokaitis (57) ABSTRACT

Technical solutions are described for verifying attendance at an alarm event. An example method includes receiving a registration of the alarm event, where the registration identifies an alarm device associated with the alarm event, and a location of the alarm event. The method also includes in response to the occurrence of the alarm, sending an alarm message to a user apparatus, where the user apparatus is within a predetermined vicinity of the location. The method also includes, in response to receiving an attendance message from the user apparatus, validating the attendance message based on predetermined conditions, where the predetermined conditions verify that the attendance message was transmitted within a predetermined expiration time and sending a reward message in response to the attendance message being valid.

20 Claims, 7 Drawing Sheets

(51) Int. Cl.
*G06Q 10/10* (2012.01)
*G08B 25/08* (2006.01)
*G08B 27/00* (2006.01)
*H04W 4/80* (2018.01)

(56) References Cited

U.S. PATENT DOCUMENTS

| | | |
|---|---|---|
| 8,589,549 B1 | 11/2013 | Vermeulen et al. |
| 8,874,466 B2 | 10/2014 | Bethke et al. |
| 8,880,629 B1 | 11/2014 | Henrick et al. |
| 9,033,803 B1 | 5/2015 | Etter et al. |
| 2009/0112708 A1 | 4/2009 | Barhydt et al. |
| 2012/0040761 A1* | 2/2012 | Auterio .................. A63F 13/12 |
| | | 463/42 |
| 2012/0101883 A1 | 4/2012 | Akhter et al. |
| 2013/0004932 A1 | 1/2013 | Mahajan et al. |
| 2013/0006736 A1 | 1/2013 | Bethke et al. |
| 2013/0053149 A1 | 2/2013 | Rouse et al. |
| 2015/0379355 A1* | 12/2015 | Kanga .............. G08B 13/19671 |
| | | 382/103 |
| 2016/0217668 A1* | 7/2016 | Meganathan .......... G08B 13/00 |

OTHER PUBLICATIONS

Mark Lee, "The Use of Punch and Pie as an Attendance Incentive : A Case Study—Overthinking It," Mar. 4, 2009, pp. 1-6.
Wikipedia, "Geocaching," pp. 1-16.
Wikipedia, [online]; [retrieved onJul. 18, 2019]; retrieved from the Internethttps://en.wikipedia.org/wiki/Krzyzewskiville.

* cited by examiner

ATTENDANCE VERIFICATION

BACKGROUND

The present application relates to computer technology, and more specifically, to an apparatus that incentivizes attendance at an event and further facilitates verification of attendance at the event.

Users typically hire a security patrol to ensure that the users are alerted in a timely manner in case of a disturbance or alarm event. An alternate benefit is the added deterrent associated with a warning of increased vigilance of a property or a location.

SUMMARY

According to an embodiment, a computer implemented method for verifying attendance at an alarm event, includes receiving, from a requester apparatus, registration of the alarm event, where the registration identifies an alarm device associated with the alarm event, and a location associated with attendance of the alarm event. The computer implemented method also includes monitoring the alarm device for occurrence of an alarm. The computer implemented method also includes in response to the occurrence of the alarm, sending an alarm message to a user apparatus, where the user apparatus is within a predetermined vicinity of the location. The computer implemented method also includes detecting receipt of an attendance message from the user apparatus. The computer implemented method also includes, in response to the receipt of the attendance message from the user apparatus, validating the attendance message based on predetermined conditions, where the predetermined conditions include the attendance message being transmitted within a predetermined expiration time since the occurrence of the alarm. The computer implemented method also includes sending a reward message corresponding to the user apparatus in response to the attendance message being valid.

According to another embodiment, a system for verifying attendance at an alarm event includes a memory and a processor. The processor receives, from a requester apparatus, registration of the alarm event, where the registration identifies an alarm device associated with the alarm event, and a location associated with attendance of the alarm event. The processor also monitors the alarm device for occurrence of an alarm. The system also includes send an alarm message to a user apparatus in response to the occurrence of the alarm, where the user apparatus is within a predetermined vicinity of the location. The processor also detects receipt of an attendance message from the user apparatus. The processor also validates the attendance message based on predetermined conditions, in response to the receipt of the attendance message from the user apparatus, where the predetermined conditions include the attendance message being transmitted within a predetermined expiration time since the occurrence of the alarm. The processor also sends a reward message corresponding to the user apparatus in response to the attendance message being valid.

According to another embodiment, a computer program product for verifying attendance at an alarm event includes a computer readable storage medium. The computer readable storage medium includes computer executable instructions. The computer readable storage medium includes instructions to receive, from a requester apparatus, registration of the alarm event, where the registration identifies an alarm device associated with the alarm event, and a location associated with attendance of the alarm event. The computer readable storage medium also includes instructions to monitor the alarm device for occurrence of an alarm. The computer readable storage medium also includes instructions to send an alarm message to a user apparatus in response to the occurrence of the alarm, where the user apparatus is within a predetermined vicinity of the location. The computer readable storage medium also includes instructions to detect receipt of an attendance message from the user apparatus. The computer readable storage medium also includes instructions to validate the attendance message based on predetermined conditions, in response to the receipt of the attendance message from the user apparatus, where the predetermined conditions include the attendance message being transmitted within a predetermined expiration time since the occurrence of the alarm. The computer readable storage medium also includes instructions to send a reward message corresponding to the user apparatus in response to the attendance message being valid.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for crowd sourced security verification that use micro incentives to verifiably attend an event at a predetermined location and perform verified actions at the event. The technical solutions facilitate reducing costs of security by using communication apparatus to incentivize users to secure or verify security of a location. The technical solutions further facilitate incentivizing attendance, or visits from users in response to occurrence of an alarm event.

The technical solutions facilitate monitoring an alarm device to detect occurrence of an alarm event and sending an alarm message to one or more registered users. The registered users may be individuals, businesses (such as security companies, patrols and so on), and other security providers. The alarm event (or a security event) may be a tripping of an alarm, such as a burglar alarm, a fire alarm, a smoke alarm, or any other such alarm that is indicative of harm to life or property. For example, the alarm may be in response to detection of smoke, fire, a predetermined sound, or detection of any other physical attribute.

The technical solutions further facilitate incentivizing one or more of the registered users to attend to the alarm event. Attending to an alarm event may include visiting a location of the alarm event to inspect the location. Attending to the alarm event may further include taking an action towards mitigating any damage that may be caused by the alarm event. Further yet, attending to the alarm event may include turning off one or more alarm devices that may be triggered by the occurrence of the alarm event. The value of a user attending to the alarm event changes with time. For example, the value to the owner of the property where the alarm event occurs is dependent on the event type, and it may be desirable to have multiple registered users to attend to the alarm event. Accordingly, the technical solutions facilitating the owner to use a requester apparatus to register the alarm event and provide information that incentivizes registered uses to attend to the alarm event. For example, if the incentive is a monetary value, larger the incentive, the higher maybe the likelihood of attendance. Further, the technical solutions further facilitate an alarm message to be sent to registered users that may be influenced to attend to the alarm event, based on an amount of effort to attend being relatively smaller than another alarm event. For example, the technical solutions provide path-finding or mapping with a trip planning system and incentivizing a registered user who may have indicated a readiness to alter a trip by a predetermined amount of time, distance, cost, or other factors. Further, the alarm event may have a short temporal window requiring immediate or nearly immediate attendance and thus. Accordingly, the technical solutions facilitate the requester to setup an expiration time on the incentive, for example, by limiting or scaling the incentive in magnitude over the expiration time, based on a number of attendees, or other such factors.

Figure 1:
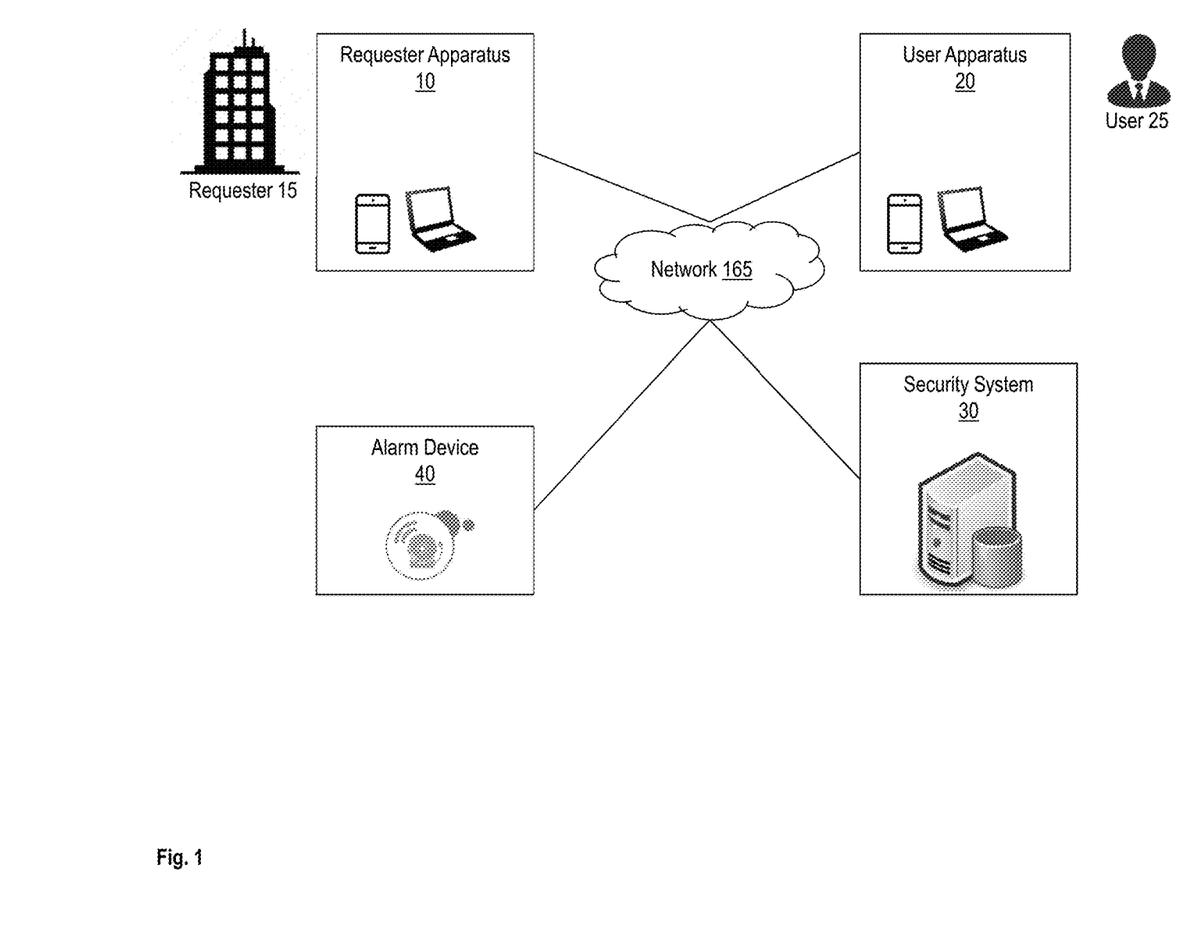
FIG. 1 illustrates an example system for incentivizing a user to attend to an alarm event and verifying such attendance in accordance with an embodiment.

FIG. 1 illustrates an example security system 30 that monitors an alarm device 40. The alarm device 40 generates an alarm notification in response to alarm events such as fire, burglary, smoke, shooting, medical emergency, gas leak, or any other alarm event. In response to the alarm notification, the security system 30 generates and sends an alarm message to a user apparatus 20. The security system 30 generates the alarm message based on a configuration that a requester apparatus 10 provides. The requester apparatus 10, the alarm device 40, the user apparatus 20, and the security system 30 may communicate with each other via a communication network 165.

Figure 2:
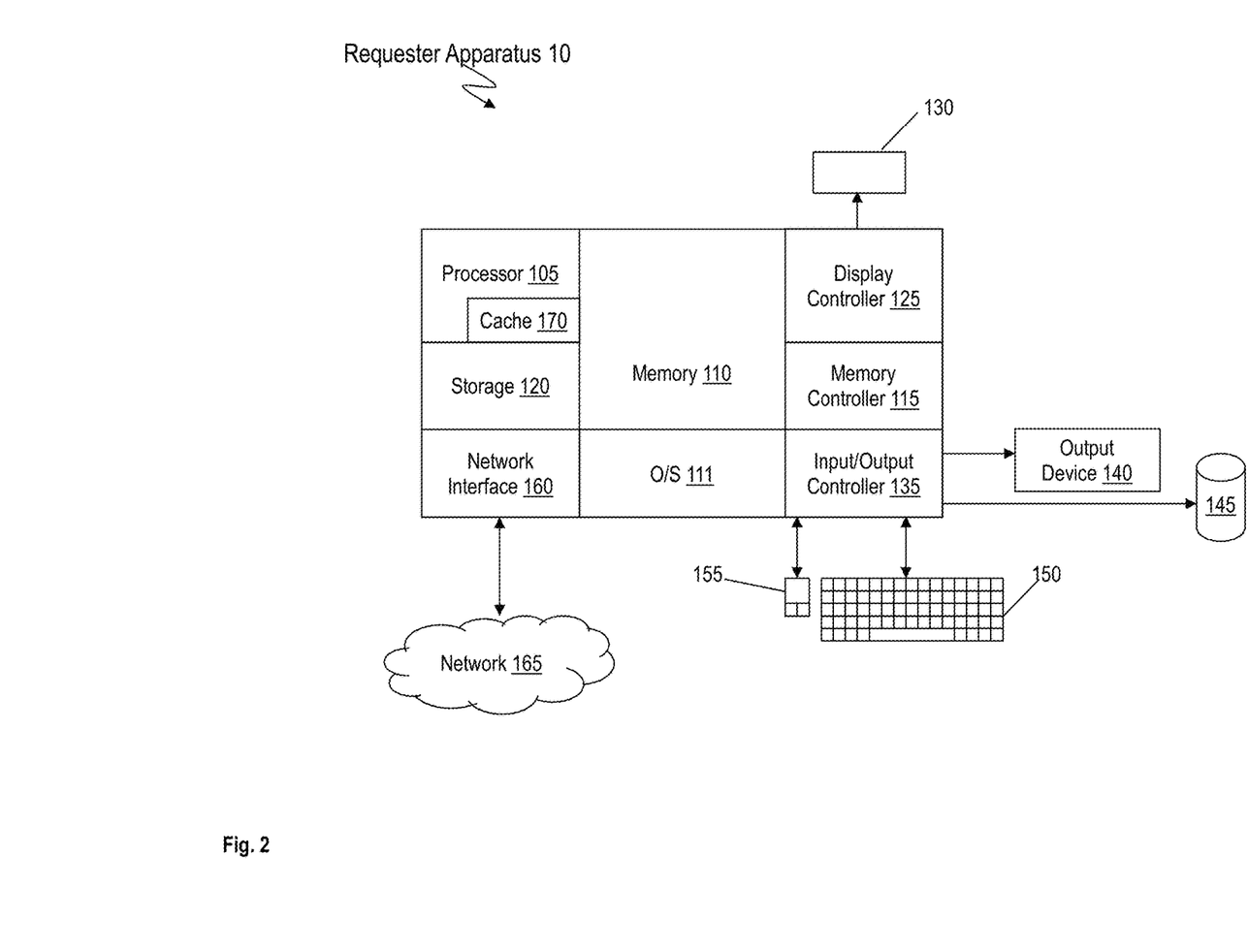
FIG. 2 illustrates components of an example message server in accordance with an embodiment.

FIG. 2 illustrates components of the requester apparatus 10. The requester apparatus 10 may be a computer server that includes hardware and electronic circuitry, such as a computer readable memory and processor that executes computer executable instructions. The requester apparatus 10 may be a communication apparatus, or any other device that communicates via the network 165. For example, the requester apparatus 10 may be a computer such as a desktop computer, a laptop computer, a tablet computer, a server computer, or any other type of computer. The requester apparatus 10 may also be a phone, such as a smartphone, a phone that operates using a public switched telephone network (PSTN), a mobile phone, a voice over internet protocol (VoIP) phone, or any other phone.

A requester 15 may control and/or operate the requester apparatus 10. Alternatively or in addition, the requester apparatus 10 may operate automatically based on a configuration that the requester 15 may provide. For example, the requester 15 may be a business, a home owner, a property owner, a governing body, a home owner's association, a property management company, or any other entity that may be harmed directly or indirectly due to the occurrence of the alarm event, and if the alarm event is not attended to in a timely manner.

For example, the requester apparatus 10 may register with the security system 30. As part of the registration, the requester apparatus 10 identifies to the security system 30 the alarm device 40 for monitoring by the security system 30. Although only one alarm device is illustrated, the requester apparatus 10 may identify one or more than one alarm devices to the security system 30. The alarm devices detect the one or more types of alarm events and, in response generate and send the alarm notification. The requester apparatus 10 further provides parameters to setup an incentivization scheme for a user 25 to attend to the alarm event as soon as possible for the user 25. In an example, the requester apparatus 10 receives the alarm notification from the alarm device 40 and sets up, or modifies, the incentivization scheme dynamically. Alternatively or in addition, the requester apparatus 10 sets up the incentivization scheme at a predetermined time, prior to the occurrence of the alarm event.

The requester apparatus 10 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the requester apparatus 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation look aside buffer (TLB) used to speed up virtual-to-physical address translation for both executable instructions and data. The cache 170 may be organized as a hierarchy of more cache levels (L1, L2, and so on).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The requester apparatus 10 may further include a display controller 125 coupled to a user interface or display 130. In some embodiments, the display 130 may be an LCD screen. In other embodiments, the display 130 may include a plurality of LED status lights. In some embodiments, the requester apparatus 10 may further include a network interface 160 for coupling to a network 165. The network 165 may be an IP-based network for communication between the requester apparatus 10 and an external server, client and the like via a broadband connection. In an embodiment, the network 165 may be a satellite network. The network 165 transmits and receives data between the requester apparatus 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
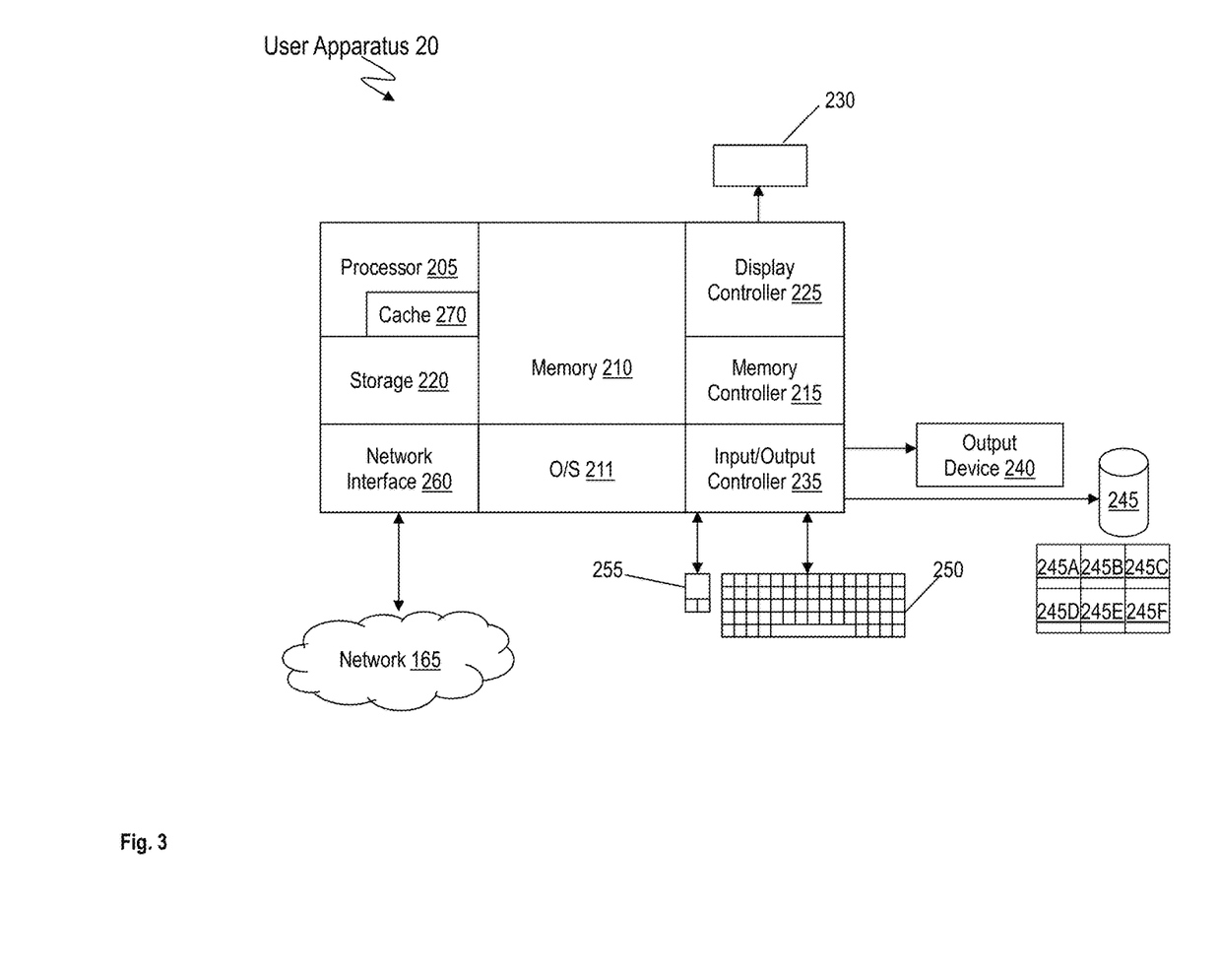
FIG. 3 illustrates components of an example client device in accordance with an embodiment.

FIG. 3 illustrates components of the user apparatus 20. The user apparatus 20 facilitates the security system 30 to send an alarm message to the user 25. For example, the security system 30 monitors the alarm device 40 as requested by the requester apparatus 10, and in response to the alarm notification from the alarm device, that is representative of an occurrence of an alarm event, the security system 30 generates and sends the alarm message via the user apparatus 20. The user apparatus 20 may be a computer server that includes hardware and electronic circuitry, such as a computer readable memory and processor that executes computer executable instructions. The user apparatus 20 may be a communication apparatus, or any other device that communicates via the network 165. For example, the user apparatus 20 may be a computer such as a desktop computer, a laptop computer, a tablet computer, a server computer, or any other type of computer. The user apparatus 20 may also be a phone, such as a smartphone, a phone that operates using a public switched telephone network (PSTN), a mobile phone, a voice over internet protocol (VoIP) phone, or any other phone.

Although only a single user 25 and a respective user apparatus 20 is illustrated, it is understood that the security system 30 sends the alarm message for receipt by one or more users via one or more corresponding user apparatus. In an example, the user 25 may have one or more user apparatus. The user 25 may be an emergency service provider. For example, the user 25 may be a service provider that attends to alarm events such as a fire, a burglary, a medical emergency, and other such emergency events. For example, the user 25 may be a security patrol.

In an example, the security system 30 sends the alarm message to the user apparatus 20 based on the user 25 registering the user apparatus 20 with the security system 30. For example, the user 25 may identify the user apparatus 20 to the security system 30, for example based on a unique identifier corresponding to the user apparatus 20, such as a media access control (MAC) address, an internet protocol (IP) address, a phone number, or any other identification of the user apparatus 20. Further, as part of registering with the security system 30, the user 25 may provide details such as name, address, phone number, web-address, and other type of contact information of the user 25. The user 25 may also indicate whether the user 25 is ready to alter an ongoing trip or task to attend to an alarm event that the security system 30 is notified about by the alarm device 40. For example, the user 25 may mark, or request the security system 30, to mark the user apparatus 20 as part of a subset of registered user apparatus marked to alter a corresponding planned trip in response to receipt of the alarm message. For example, the security system 30 may determine a location of the user apparatus 20, or alternatively may receive a location of the user 25 from the user apparatus 20. The security system 30 may accordingly determine if the user 25 is in a position to attend to the alarm event within the expiration time, for example by determining whether the user 25 is in a predetermined proximity (or vicinity) of a location of the alarm event.

The user apparatus 20, in response to the alarm message from the security system 30, may respond with an attendance message indicative of the user 25 attending to the alarm event. The alarm message may include data that the security system 30 uses to validate the attendance message to ensure that the user 25 attended to the alarm event. For example, the alarm message may include an indication of a time and location of the user apparatus at the time of generation of the attendance message. The alarm message may further include an identifier corresponding to the alarm event, such as an image of an object at the location of the alarm event, for example, a quick response code. Alternatively or in addition, the identifier may be a dynamic identifier that is generated at the location of the alarm event by an identifier generation device and in response to the alarm event, as described elsewhere herein.

The user apparatus 20 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 245A, accelerometer 245B, global positioning signal receiver 245C), indicator/identification lights and the like. The devices 240 and 245 may further include input devices such as a camera 245D that captures images, an radio frequency scanner/ identifier 245E, a BLUETOOTH® identifier scanner, a service set identifier scanner 245F, and other such input devices. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the user apparatus 20, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation look aside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The user apparatus 20 may further include a display controller 225 coupled to a user interface or display 230. In some embodiments, the display 230 may be an LCD screen. In other embodiments, the display 230 may include a plurality of LED status lights. In some embodiments, the user apparatus 20 may further include a network interface 260 for coupling to the network 165.

The security system 30 is a communication apparatus that communicates with the requester apparatus 10, the user apparatus 20, and the alarm device 40. The security system 30 may be a server computer, such as a distributed server, a virtual server, or any other type of server that includes hardware, such as electronic circuitry. In an example, as illustrated the security system 30 is a separate, standalone apparatus. In another example, the security system 30 may be part of one of the requester apparatus 10. In yet another example, the security system 30 is part of one of the user apparatus 20. Alternatively or in addition, the security system 30 may be a distributed system that partially exists on the requester apparatus 10 and/or the user apparatus 20. The security system 30, in an example, may be a computer program product that is part of the one or more requester apparatus or the one or more user apparatus 20.

Figure 4:
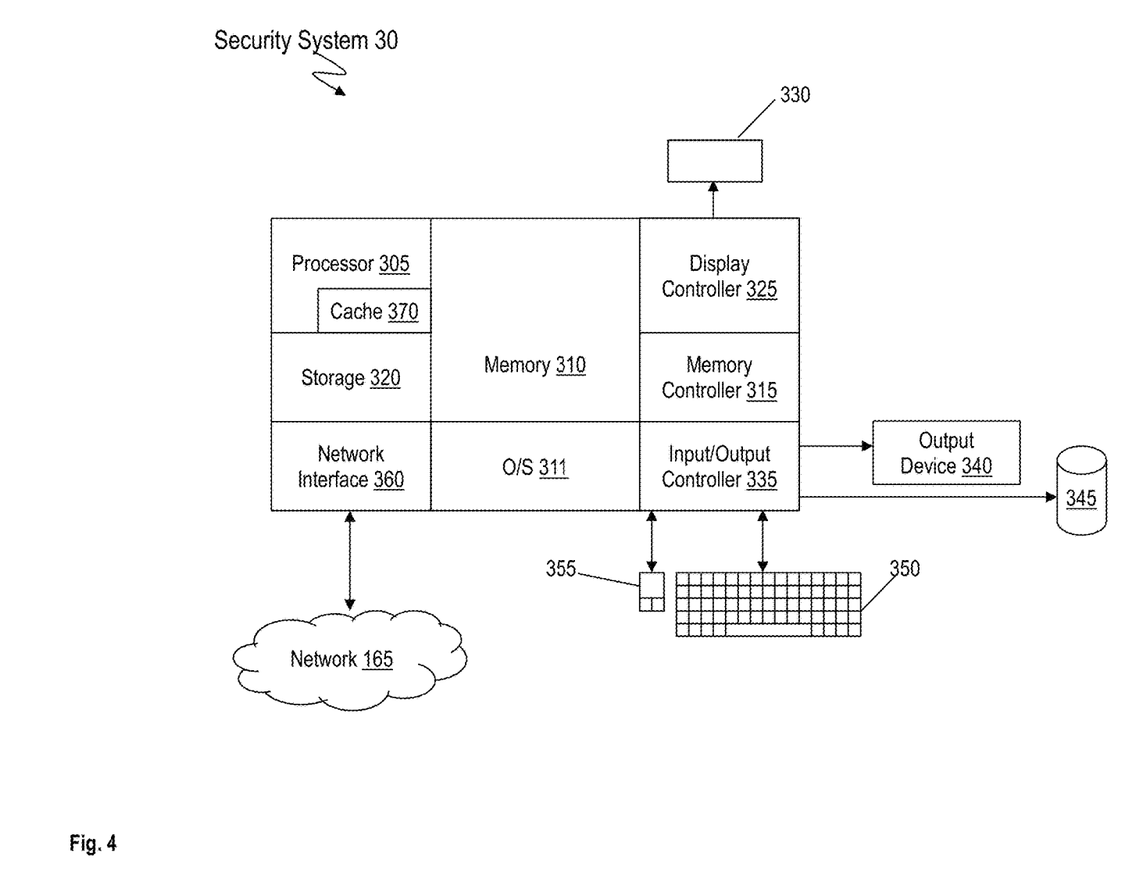
FIG. 4 illustrates components of an example message response system in accordance with an embodiment.

FIG. 4 illustrates example components of the security system 30. The security system 30 includes, among other components, a processor 305, memory 310 coupled to a memory controller 315, and one or more input devices 345 and/or output devices 340, such as peripheral or control devices, that are communicatively coupled via a local I/O controller 335. These devices 340 and 345 may include, for example, battery sensors, position sensors, indicator/identification lights and the like. Input devices such as a conventional keyboard 150 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the security system 30, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation look aside buffer (TLB) used to speed up virtual-to-physical address translation for both executable instructions and data. The cache 370 may be organized as a hierarchy of more cache levels (L1, L2, and so on).

The memory 310 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 2, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The security system 30 may further include a display controller 325 coupled to a user interface or display 330. In some embodiments, the display 330 may be an LCD screen. In other embodiments, the display 330 may include a plurality of LED status lights. In some embodiments, the security system 30 may further include a network interface 360 for coupling to the network 165.

Figure 5:
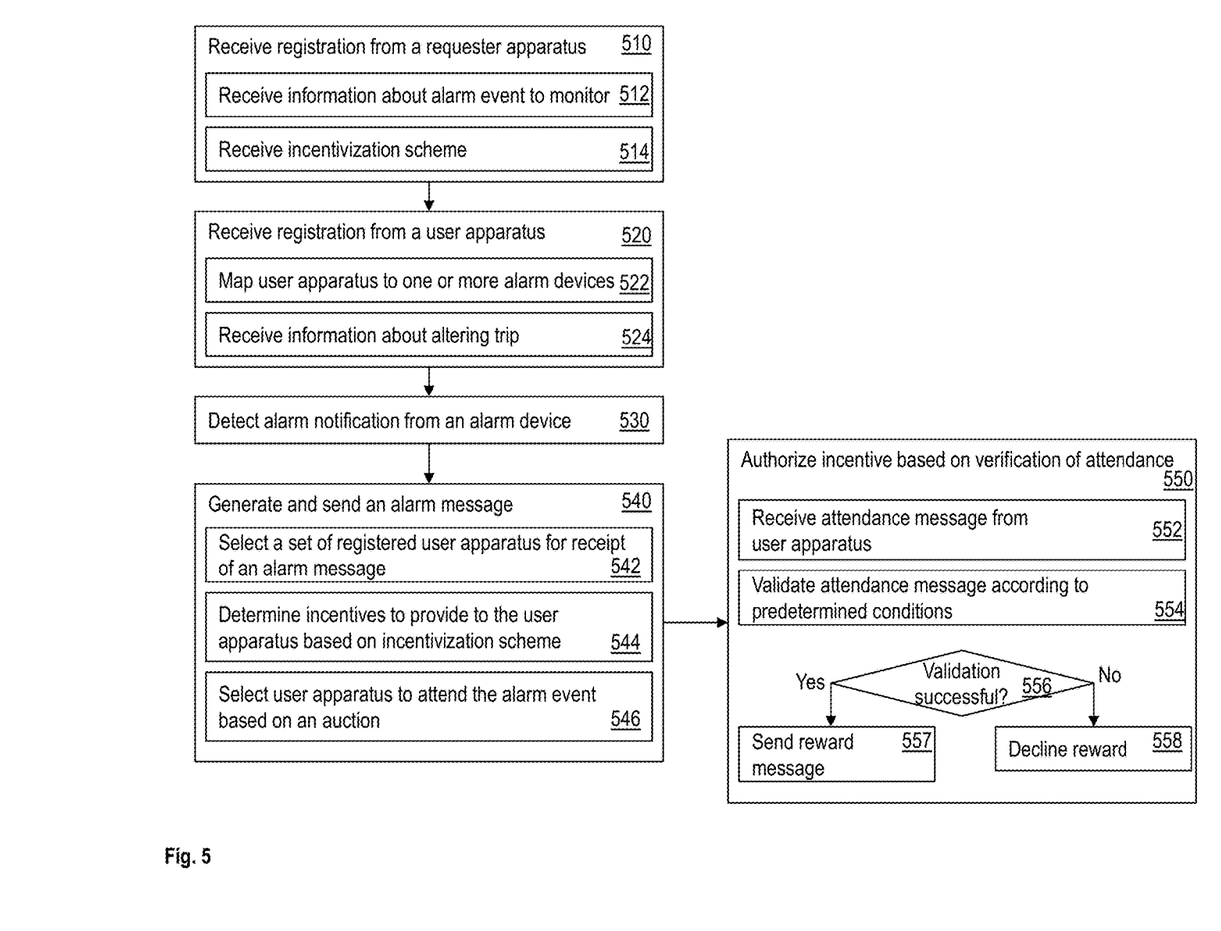
FIG. 5 illustrates a flowchart of example logic for incentivizing a user to attend to the alarm event and verifying the attendance, in accordance with an embodiment.

FIG. 5 illustrates a flowchart of example logic for incentivizing the user 35 to attend to the alarm event and verifying the attendance. The security system 30 implements the method illustrated by the flowchart, such as by executing computer readable instructions that are stored in a computer readable storage medium, in an example. The sequence of operations illustrated is just an example, and the operations may be implemented in different order in different examples. The security system 30 receives a registration from the requester apparatus 10, as shown at block 510. For example, the registration includes information about the alarm event to monitor, as shown at block 512. For example, the information may include a type of the alarm event to monitor, such as a fire event, a burglary event, a break-in event, a medical emergency event, or any other type of alarm event. Alternatively or in addition, the information may include an identification of the alarm device 40, which detects the alarm event. For example, the identification of the alarm device may include an identifier of the alarm device 40, such as a MAC address, an IP address, or any other identifiers that uniquely identify the alarm device 40, or a combination thereof.

Alternatively or in addition, the information may include a location of the alarm event, such as GPS coordinates, or any other type of geo-location identifier. In an example, the requester apparatus 10 may be scheduling the alarm event such as for a drill, or for testing the alarm event infrastructure, or for any other purpose, and accordingly, may include a scheduled time for the occurrence of the alarm event in the registration information. Further yet, the registration information may include a time-window for the user 25 to attend to the alarm event. For example, the requester apparatus 10 may specify that the alarm event is to be attended to within two minutes of the occurrence of the alarm event. The time-window may vary in other examples, such as ten minutes, 30 minutes, an hour, a day, or any other time span. The security system 30 uses the provided time-window to determine an expiration time for the user 25 to attend to the alarm event.

In addition, the security system 30 receives an incentivization scheme from the requester apparatus 10, as shown at block 514. For example, consider that the requester apparatus 10 authorizes a monetary compensation as an incentive to the user 25 upon verifying that the user 35 attended to the alarm event. It will be obvious to a person skilled in the art that the incentive may be in other forms, such as points, goods, services, coupons, discounts, billing credit, rebate, or any other form of compensation in other examples. For example, consider that the incentivization scheme specifies an amount of money that the requester 15 has allocated, or authorized to pay per attendance of the alarm event. Since the alarm event may have a short temporal window indicating an immediate or a nearly immediate attendance, the incentivization scheme may specify limiting or scaling the incentive as a function of passage of time. For example, the requester apparatus 10 may specify the incentive amount is to be reduced by a predetermined amount or scaling factor for each predetermined period of time since occurrence of the alarm event, or transmission of the alarm message by the security system 30. Alternatively or in addition, the incentivization scheme may limit and/or scale the authorized amount by or scale in magnitude by a number of users attending to the alarm event, or other factors, or a combination thereof.

For example, the incentivization scheme may divide the authorized amount equally among users attending to the alarm event. In another example, the incentivization scheme may divide the authorized amount among the attendees based on a weighted scheme that is based on timeliness of the attendees. For example, the time elapsed from the user 25 receiving the alarm message to the user 25 sending the attendance message in response may be used to determine the weight by which to scale the portion of the incentive that the user 25 receives from the total amount authorized. Further yet, the total amount authorized does not alter by the number of users who attend to the alarm event, however the incentivization scheme may specify a set number of users who may receive a portion of the incentive. For example, the first five, first ten, or any other number of users that respond to the alarm event. In yet another example, the incentivization scheme personalizes the portion or amount of the incentive that the user 25 receives. For example, the requester apparatus 10 scales the portion of the incentive of the user 25 based on an influencer score assigned to the user 25. For example, the influencer score may be determined by the security system 30 based on a number of additional users that the user 25 brings to the location of the alarm event. For example, the influencer score may be determined by the additional users indicating the user 30 as the source of information of the alarm event. In an example, the user 25 sends the received alarm message to additional users that may or may not be registered with the security system 30. The additional users may respond with attendance messages, via respective user apparatus, to the alarm message that was originally sent to the user apparatus 20 corresponding to the user 25. The security system 30 receiving the attendance messages from the additional users may accordingly determine the influencer score of the user 25. In another example, the influencer score may additionally or alternatively, be based on a rating or reputation score of the user 25. For example, the security system 30 may determine the rating or reputation score of the user 25 based on a third party evaluation, such as a better business bureau (BBB) rating, a rating on an online service, such as YELP™, PINTEREST™, or any other such rating.

In yet another example, the incentive amount authorized for attending the alarm event may be determined dynamically, for example based on a time of day, day of week, day of year, or other such factors. Thus, the security system 30 determines the authorized amount to be used as incentive for attending to the alarm event based on the parameters that the incentivization scheme specifies.

The security system 30 receives registration from the user apparatus 20, as shown at block 520. For example, the security system 30 receives information regarding the user 25, for example, the types of alarm events that the user 25 is capable/qualified to attend. For example, the user 25, in an example may be qualified as a paramedic and thus, qualified to attend to a medical emergency. In another example, the user 25 may be a volunteer fireman, and thus qualified to attend to a fire event. Other types of qualifications of the user 25 may be received Based on the information, the security system 30 maps the user 25 to the alarm device 40 that detects alarm events that the user 25 is qualified to attend to, as shown at block 522.

The security system 30 further receives information about the user 25 willing to alter a trip to attend to the alarm event, as shown at block 524. For example, the user apparatus 20 provides an amount of time, and/or distance that the user 25 is willing to alter a trip by for the incentive. Accordingly, the security system 30 marks the user apparatus 20 for altering a trip of the user apparatus 20 in response to the alarm message.

The security system 30, in response to detecting an alarm notification from the alarm device 40, generates and sends the alarm message to the user apparatus 20, as shown at the blocks 530 and 540. The alarm notification may be in response to tripping of an alarm by the alarm device 40 or any other security appliance or expert system. In an example, the security system 30 selects a set of registered user apparatus for receipt of the alarm message, as shown at block 542. In an example, the security system 30 incorporates a path-finding or mapping trip planning system that identifies the user 25 as a potential attendee based on the proximity of the user apparatus 20 to the location of the alarm event. The security system 30 selects the user apparatus 20 further based on the user apparatus 20 being mapped to the alarm device 40. In an example, the security system 30 selects a set of user apparatus that are mapped to the alarm device 40 and those that are in proximity of the location alarm event. The proximity may be based on a predetermined distance from the location of the alarm event. Further, the security system 30 may select a subset of user apparatus from the set of user apparatus, such that the user apparatus in the subset are user apparatus that are marked to alter their corresponding trips.

In an example, the alarm event may be a schedule alarm event, such as to test the alarm event infrastructure. Thus, the security system 30 receives a scheduled alarm time for occurrence of the alarm, and in response to receipt of the scheduled alarm time, the security system 30 determines a set of user apparatus scheduled to be in the vicinity of the location of the alarm event at the scheduled alarm time. For example, the set of user apparatus is determined based on a planned trip of each respective user apparatus in the set of user apparatus. The security system 30 accesses the planned trip of the respective user apparatus using information provided by the respective users, and or by accessing calendars of the respective users, such as using internet-of-things (IoT). The security system 30 may further determine, from the set of user apparatus, a subset of user apparatus, each user apparatus in the subset marked to alter the corresponding planned trip in response to receipt of the alarm message. The security system 30 may communicate, to the requester apparatus 10, the number of user apparatus in the subset of user apparatus representative of the user apparatus that are marked to alter corresponding planned trips to attend the alarm event. The security system 30 may additionally provide a list of the users corresponding to the user apparatus in the subset. The requester apparatus 10 may select the user 25 to attend to the alarm event from the list, such as based on the ratings of the users. Alternatively or in addition, the user apparatus 20 may select the total payment amount for attending to the alarm event based on the number of the user apparatus in the subset.

Further, the security system 30 calculates the portion of the incentive that the respective user apparatus in the subset of user apparatus may receive in case the user apparatus in the subset attend to the alarm event, as shown at block 544. For example, the security system 30 determines the incentive portions based on the incentivization scheme from the requester apparatus 10. The security system 30, in an example, includes the potential incentive in the alarm message that it sends to the user apparatus 20.

Figure 7:
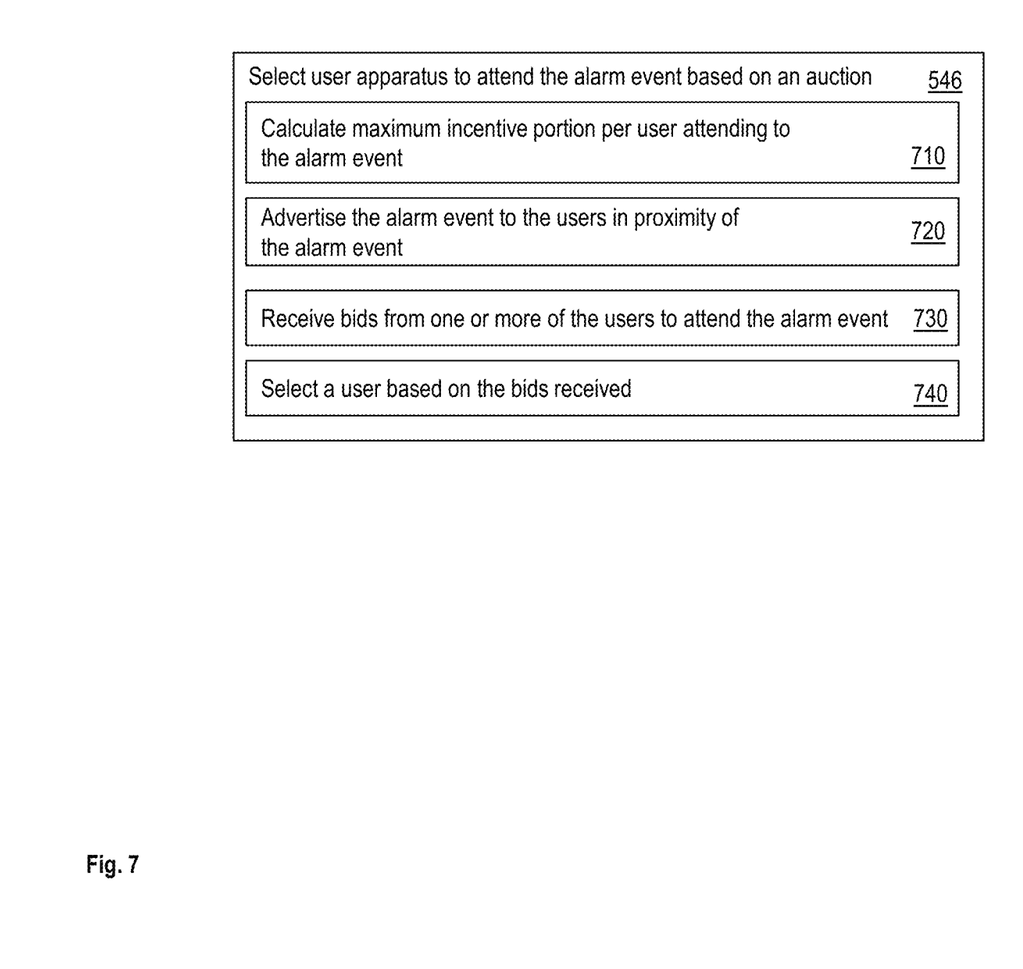
FIG. 7 illustrates a flowchart of facilitating users in vicinity of an alarm event to bid for attending to the alarm event, in accordance with an embodiment.

Thus, if an alarm is tripped or an alarm event is raised the security system 30 sends a price signal to the users who may be in a position to attend the alarm event. The security system 30 may facilitate the users to auction based on the incentive, as shown at block 546. FIG. 7 illustrates a flowchart of facilitating users in vicinity of the alarm event to bid for attending to the alarm event. The security system 30 accordingly calculates a maximum incentive that is payable to the user 25 upon attending the event, as shown at block 710. For example, the requester apparatus 10 may setup the incentivization scheme such that the number of attendees is to be limited to a predetermined number, such as one, two, four, or any other number. The incentivization scheme further specifies a total payment amount that is to be divided among the attendees. The security system 30 accordingly calculates a maximum incentive that is payable to the user 25 upon attending the event. The security system 30 may advertise the alarm message to the users in proximity of the alarm event, requesting bids from the user to be selected for attending to the alarm event, as shown at block 720. The recipient users may bid to be one of the users to attend to the alarm event, as shown at block 730. The security system 30 selects the user 25 from the users that bid to attend to the alarm event, as shown at block 740. For example, the user 25 may be the user with the lowest bid to attend to the alarm event. Alternatively or in addition, the user 25 may be the user with highest rating from the users that bid for attending the alarm event. In yet another example, a combination of the bid and the rating of the user may be used to select the user 25. In an example, the security system 30 may withhold the location of the alarm event until the user 25 is selected to attend to the event based on the auction process. The security system 30 sends the location of the alarm event to the selected user, so that the selected user can attend to the alarm event and take specific actions, such as to mitigate any harm caused by the alarm event.

The security system 30 further authorizes incentive to be given to the user 25 based on verification of attendance of the user 25, as shown at block 550. For example, the security system 30 receives an attendance message from the user apparatus 20, that the security system 30 validates based on a set of predetermined conditions to ensure that the user 25 indeed attended to the alarm event, as shown at blocks 552 and 554.

Figure 6:
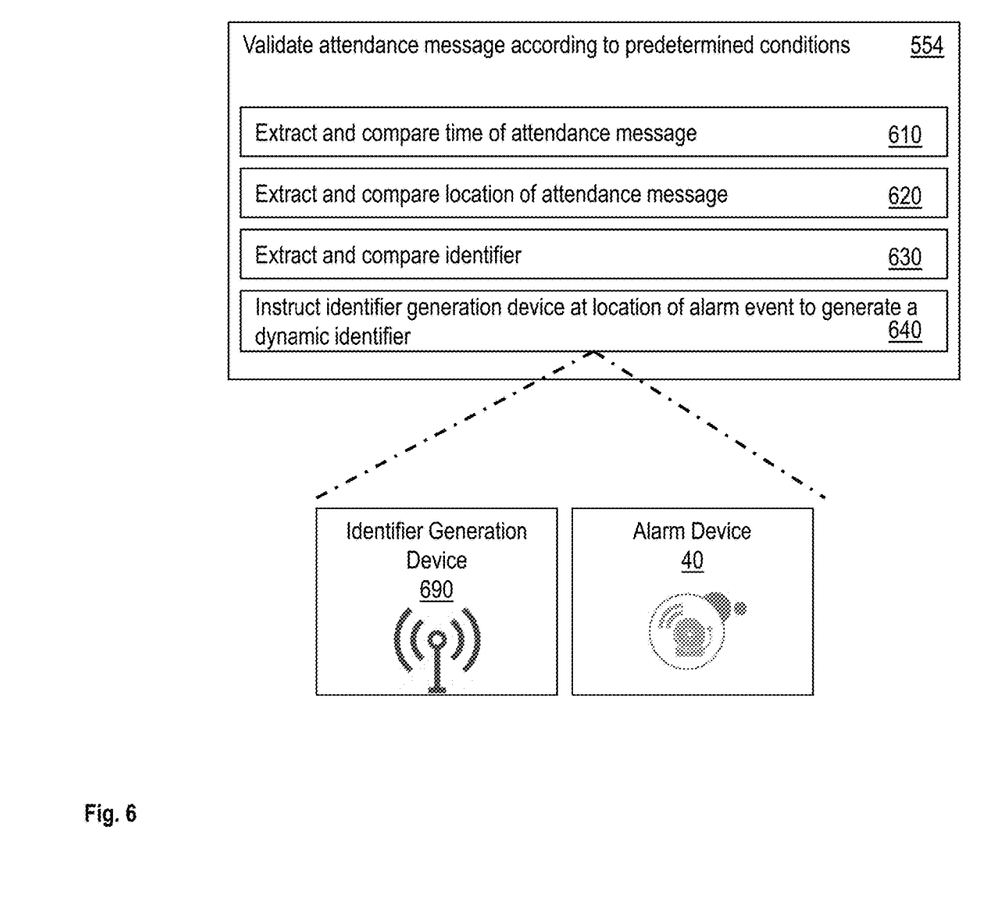
FIG. 6 illustrates operations that a security system implements to verify attendance of an alarm event, in accordance with an embodiment.

FIG. 6 illustrates operations that security system 30 implements to verify the attendance, as shown at block 554. For example, the predetermined conditions that the security system 30 checks for include a timing of the attendance message, as shown at block 610. As described herein, the incentive to the user 25 may be based on the time elapsed since the transmission of the alarm message and limited to the user 25 that attended to the alarm event within the expiration time. Accordingly, the security system 30 checks that the user apparatus 20 sent the attendance message within the expiration time and calculates the incentive for the corresponding user 25 accordingly. Thus, the security system 30 extracts a time of transmission of the attendance message and compares that with the time of transmission of the alarm message. In another example, the security system 30 compares the time of transmission of the attendance message with the time of occurrence of the alarm event. Of course, in another example, the security system 30 may use another timestamp associated with the attendance message to determine that the user 25 attended to the alarm message within the expiration time and calculation of the incentive.

Alternatively or in addition, the security system 30 extracts and compares a location of the attendance message with the location of the alarm event, as shown at the block 620. For example, the attendance message may include a location identifier of the user apparatus 20 that sends the attendance message. Alternatively or in addition, the security system 30 determines the location of the user apparatus 20 at the time of transmission of the attendance message by accessing the position sensors (see 245) of the user apparatus 20. In another example, the security system 30 determines the location of the user apparatus 20 from other sources such as, but not limited to internet-of-things (IoT) devices, mobile phones, micro transactions systems, alarms, security appliances, expert systems, and so on. If the location of the attendance message is not within a predetermined proximity of the location of the alarm event, the security system 30 invalidates the attendance message. Else, if the location of the attendance message is within the predetermined proximity of the location of the alarm event, the attendance is successfully verified towards authorization of the incentive for the user 25.

Alternatively or in addition, the security system 30 validates the attendance message using an identifier, as shown at block 630. For example, the identifier may include data associated with the location of the alarm event. For example, the identifier may include an image of an object at the location of the alarm event, such as an image of a mailbox, a nameplate, a signage, or any other unique item that is located at the location of the alarm event. For example, the attendance message from the user apparatus 20 includes an image of the unique object. The security system 30 receives an image of the unique object from the requester apparatus 10 during registration. The security system 30 compares the images from the user apparatus 20 and the requester apparatus 10 to validate that the user apparatus is indeed at the location of the alarm event. In another example, the unique object at the alarm event may include a quick response code, a barcode or any other identifier that is placed at the location of the alarm event. For example, the identifier may be part of a sticker that is placed on the alarm device 40 that is located at the location of the alarm event.

In another example, the identifier may be a dynamic identifier. For example, the security system 30 instructs an identifier generation device 690 that is located at the location of the alarm event to generate the dynamic identifier, as shown at block 640. The user apparatus 20 scans the dynamic identifier and sends the dynamic identifier to the security system 30 along with, or as part of the attendance message. In another example, the identifier generation device 690 generates the dynamic identifier in response to the alarm notification from the alarm device 40, or any other triggering event. The identifier generation device 690 may generate, as the dynamic identifier, a barcode, a quick response code, a radio frequency identifier, a BLUETOOTH® identifier, and a service set identifier (SSID) broadcast by a wireless access point, or any other type of identifier. The user apparatus 20, using one or more of the devices 245, scans the dynamic identifier and sends it to the security system 30 for verification that the user apparatus indeed attended to the alarm event. For example, the dynamically generated identifier, such as the SSID and/or the Bluetooth ID, is generated per event as a unique token. Thus, the user 25 apparatus has to be at the location of the alarm event to observe the identifier. Additionally, the identifier generation device 690 generates the identifier once the alarm event has occurred or in response to the alarm notification, and thus the identifier is generated per alarm event. In yet another example, the identifier generation device 690 generates the identifier per user, further ensuring verification of attendance. For example, the user 25 may have to trigger the generation of the identifier at the location of the alarm event via the user apparatus 20. Thus, the identifier generation device 690 generates the dynamic identifier data user and/or per alarm event. Thus, a possibility of the security system 30 being faked using stored data is reduced. The identifier generation device 690, although illustrated separate from the alarm device 40, may be part of the alarm device 40 in another example.

Referring back to FIG. 5, based on the result of the validation of the attendance message, the security system 30 either authorizes or declines a payment of the incentive to the user 25, as shown at blocks 556, 557, and 558. In an example, the security system 30 sends a reward message if the validation is successful and declines the reward in case the validation is unsuccessful, as shown at blocks 557 and 558. For example, the security system 30 may instruct a payment system to transmit the portion of the incentive to the user 25 via the user apparatus 20. In another example, the security system 30 sends a message to the requester apparatus to forward the incentive portion to the user apparatus 20. In yet another example, the security system 30 releases a payment of the incentive portion to the user 25 via the user apparatus 20, or any other technique.

Thus, the technical solutions described herein facilitate a requester to register one or more alarm devices or alarm types for a security system to monitor. In response to occurrence of an alarm event, the security system generates and sends an alarm message to one or more users registered to respond to the alarm event. The security system may select the registered users that receive the alarm message based on registration information from the users as well as the users' proximity to the location of the alarm event as well as the time of occurrence of the alarm event. The security system may further calculate an incentive for a user that attends the alarm event based on an incentivization scheme that is based on information from the requester. The security system further receives an attendance message from a user apparatus, and verifies that the user indeed went to the alarm event location based on one or more aspects of the attendance message. The security system, for example, may determine attendance by the user based on an identifier located at or dynamically generated at the alarm event location. If the attendance is verified, the security system forwards payment of the incentive to the user. The technical solutions thus facilitate a use of economic incentives for attending to or photographing notified events during a temporal window that is activated through the tripping of an alarm or via an disclosed security appliance. The technical solutions further facilitate selecting users to attend to the alarm event based on an auction of economic incentive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for verifying attendance at an alarm event, the method comprising:
receiving, from a requester apparatus, registration of the alarm event, wherein the registration identifies an alarm device associated with the alarm event, and a location associated with attendance of the alarm event;
monitoring the alarm device for occurrence of an alarm;
in response to the occurrence of the alarm, sending, via a computer-based communication network, an alarm message to a user apparatus, wherein the user apparatus is within a user-specified predetermined vicinity of the location;
detecting receipt of an attendance message from the user apparatus;
in response to the receipt of the attendance message from the user apparatus, validating the attendance message based on predetermined conditions, wherein the predetermined conditions comprise the attendance message being transmitted within a predetermined expiration time since the occurrence of the alarm, and wherein the predetermined conditions further comprise verifying, by the requester apparatus, the presence of the user at the alarm event based on a communication from the user apparatus;
sending, via a computer-based communication network, a reward message corresponding to the user apparatus in response to the attendance message being valid; and
in response to validating the attendance message, directing a payment to the user via the user apparatus.

2. The computer implemented method of claim 1, further comprising:
receiving, an alarm time from the requester apparatus, the alarm time being a scheduled time of occurrence of the alarm; and
in response to receipt of the alarm time:
determining a set of user apparatus scheduled to be in the predetermined vicinity of the location of the alarm event at the alarm time, wherein the set of user apparatus is determined based on a planned trip of each respective user apparatus in the set of user apparatus;
determining, from the set of user apparatus, a subset of user apparatus, each user apparatus in the subset is marked to alter a corresponding planned trip in response to receipt of the alarm message; and
communicating to the requester apparatus of a number of user apparatus in the subset of user apparatus representative of the user apparatus that are marked to alter corresponding planned trips to attend the alarm event.

3. The computer implemented method of claim 1, further comprising:
receiving, from the user apparatus, a registration of participation in the alarm event, wherein the registration of participation indicative of the user apparatus being marked for altering a planned trip of the user apparatus in response to receipt of the alarm message.

4. The computer implemented method of claim 1, further comprising, receiving, from the requester apparatus, a total payment amount associated with the event, wherein a portion of the total payment amount is distributed as part of the reward message.

5. The computer implemented method of claim 1, further comprising:
receiving, from the requester apparatus, a predetermined number of attendees to incentivize for attending the alarm event; and
selecting a distribution amount as an incentive for the user apparatus to attend the alarm event, the distribution amount selected based on an influencer score assigned to the user apparatus and a total payment amount.

6. The computer implemented method of claim 1, wherein the predetermined conditions further comprise the attendance message including a geo-location identifier that matches the location of the alarm event.

7. The computer implemented method of claim 1, wherein the predetermined conditions further comprise the attendance message including an identifier that matches a predetermined identifier.

8. The computer implemented method of claim 7, wherein the predetermined identifier is dynamically generated by an identifier generation apparatus at the location of the alarm event.

9. The computer implemented method of claim 7, wherein the predetermined identifier comprises at least one of an image of a quick response code, a radio frequency identifier, a BLUETOOTH® identifier, and a service set identifier broadcast by a wireless access point.

10. A system for verifying attendance at an alarm event, the system comprising:
a memory; and
a processor configured to:
receive, from a requester apparatus, registration of the alarm event, wherein the registration identifies an alarm device associated with the alarm event, and a location associated with attendance of the alarm event;
monitor the alarm device for occurrence of an alarm;
send, via a computer-based communication network, an alarm message to a user apparatus in response to the occurrence of the alarm, wherein the user apparatus is within a user-specified predetermined vicinity of the location;
detect receipt of an attendance message from the user apparatus;
validate the attendance message based on predetermined conditions, in response to the receipt of the attendance message from the user apparatus, wherein the predetermined conditions comprise the attendance message being transmitted within a predetermined expiration time since the occurrence of the alarm, and wherein the predetermined conditions further comprise verifying, by the requester apparatus, the presence of the user at the alarm event based on a communication from the user apparatus;
send, via a computer-based communication network, a reward message corresponding to the user apparatus in response to the attendance message being valid; and
in response to validating the attendance message, direct a payment to the user via the user apparatus.

11. The system of claim 10, wherein the processor is further configured to:

receive, an alarm time from the requester apparatus, the alarm time being a scheduled time of occurrence of the alarm; and in response to receipt of the alarm time:
determine a set of user apparatus scheduled to be in the predetermined vicinity of the location of the alarm event at the alarm time, wherein the set of user apparatus is determined based on a planned trip of each respective user apparatus in the set of user apparatus;
determine, from the set of user apparatus, a subset of user apparatus, each user apparatus in the subset is marked to alter a corresponding planned trip in response to receipt of the alarm message; and
communicate to the requester apparatus of a number of user apparatus in the subset of user apparatus representative of the user apparatus that are marked to alter corresponding planned trips to attend the alarm event.

12. The system of claim 10, wherein the processor is further configured to receive, from the user apparatus, a registration of participation in the alarm event, wherein the registration of participation indicative of the user apparatus being marked for altering a planned trip of the user apparatus in response to receipt of the alarm message.

13. The system of claim 10, wherein the processor is further configured to receive, from the requester apparatus, a total payment amount associated with the event, wherein a portion of the total payment amount is distributed as part of the reward message.

14. The system of claim 10, wherein the processor is further configured to:
receive, from the requester apparatus, a predetermined number of attendees to incentivize for attending the alarm event; and
select a distribution amount as an incentive for the user apparatus to attend the alarm event, the distribution amount selected based on an influencer score assigned to the user apparatus and a total payment amount.

15. The system of claim 10, wherein the predetermined conditions further comprise the attendance message including a geo-location identifier that matches the location of the alarm event.

16. The system of claim 10, wherein the predetermined conditions further comprise that the attendance message includes an event identifier that is dynamically generated by an identifier generation apparatus at the location of the alarm event.

17. A computer program product for verifying attendance at an alarm event, the computer program product comprising a computer readable storage medium, the computer readable storage medium comprising computer executable instructions, wherein the computer readable storage medium comprises instructions to:
receive, from a requester apparatus, registration of the alarm event, wherein the registration identifies an alarm device associated with the alarm event, and a location associated with attendance of the alarm event;
monitor the alarm device for occurrence of an alarm;
send, via a computer-based communication network, an alarm message to a user apparatus in response to the occurrence of the alarm, wherein the user apparatus is within a user-specified predetermined vicinity of the location;
detect receipt of an attendance message from the user apparatus;
validate the attendance message based on predetermined conditions, in response to the receipt of the attendance message from the user apparatus, wherein the predetermined conditions comprise the attendance message being transmitted within a predetermined expiration time since the occurrence of the alarm, and wherein the predetermined conditions further comprise verifying, by the requester apparatus, the presence of the user at the alarm event based on a communication from the user apparatus;
send, via a computer-based communication network, a reward message corresponding to the user apparatus in response to the attendance message being valid; and
in response to validating the attendance message, direct a payment to the user via the user apparatus.

18. The computer program product of claim 17, wherein the computer readable medium further comprises instructions to:
receive, an alarm time from the requester apparatus, the alarm time being a scheduled time of occurrence of the alarm; and
in response to receipt of the alarm time:
determine a set of user apparatus scheduled to be in the predetermined vicinity of the location of the alarm event at the alarm time, wherein the set of user apparatus is determined based on a planned trip of each respective user apparatus in the set of user apparatus;
determine, from the set of user apparatus, a subset of user apparatus, each user apparatus in the subset is marked to alter a corresponding planned trip in response to receipt of the alarm message; and
communicate to the requester apparatus of a number of user apparatus in the subset of user apparatus representative of the user apparatus that are marked to alter corresponding planned trips to attend the alarm event.

19. The computer program product of claim 17, wherein the computer readable medium further comprises instructions to receive, from the user apparatus, a registration of participation in the alarm event, wherein the registration of participation indicative of the user apparatus being marked for altering a planned trip of the user apparatus in response to receipt of the alarm message.

20. The computer program product of claim 17, wherein the predetermined conditions further comprise that the attendance message includes an event identifier that is dynamically generated by an identifier generation apparatus at the location of the alarm event.

* * * * *